(12) United States Patent
Lee (10) Patent No.: US 11,210,012 B2
(45) Date of Patent: Dec. 28, 2021

(54) DATA STORAGE DEVICE AND OPERATING METHOD THEREOF WHERE ZONES, IN FIRST LEVEL MEMORY AND SECOND LEVEL MEMORY, ARE DYNAMICALLY ADJUSTED BASED ON DATA MOVEMENT BETWEEN THE ZONES

(71) Applicant: SK hynix Inc., Icheon (KR)

(72) Inventor: Kyung Soo Lee, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/941,327

(22) Filed: Jul. 28, 2020

(65) Prior Publication Data

US 2021/0303186 A1 Sep. 30, 2021

(30) Foreign Application Priority Data

Mar. 30, 2020 (KR) ........................ 10-2020-0038339

(51) Int. Cl.
*G06F 3/06* (2006.01)

(52) U.S. Cl.
CPC ............ *G06F 3/0649* (2013.01); *G06F 3/061* (2013.01); *G06F 3/0685* (2013.01)

(58) Field of Classification Search
CPC .... G06F 3/0647; G06F 3/0634; G06F 3/0629; G06F 3/0685; G06F 12/0873
See application file for complete search history.

(56) References Cited

U.S. PATENT DOCUMENTS

| | | | |
|---|---|---|---|
| 2012/0144109 A1* | 6/2012 | Balakrishnan | G06F 12/0871 711/113 |
| 2018/0059955 A1* | 3/2018 | Moon | G06F 3/0608 |

FOREIGN PATENT DOCUMENTS

| | | |
|---|---|---|
| KR | 100974774 B1 | 8/2010 |
| KR | 101419615 B1 | 7/2014 |

* cited by examiner

*Primary Examiner* — Chie Yew (57) ABSTRACT

A data storage device includes: a first level memory including a first zone and a second zone, a size ratio of the first zone to the second zone being dynamically adjusted; a second level memory including a third zone and a fourth zone, a size ratio of the third zone to the fourth zone being dynamically adjusted according to the size ratio of the first zone to the second zone; and a controller configured to control data movement among the first to fourth zones, compare a counting value obtained based on the data movement with a reference value, and dynamically adjust the size ratio of the first zone to the second zone and the size ratio of the third zone to the fourth zone according to a result of comparing.

21 Claims, 5 Drawing Sheets

DATA STORAGE DEVICE AND OPERATING METHOD THEREOF WHERE ZONES, IN FIRST LEVEL MEMORY AND SECOND LEVEL MEMORY, ARE DYNAMICALLY ADJUSTED BASED ON DATA MOVEMENT BETWEEN THE ZONES

CROSS-REFERENCES TO RELATED APPLICATION

The present application claims priority under 35 U.S.C. § 119(a) to Korean Patent Application Number 10-2020-0038339, filed on Mar. 30, 2020, in the Korean Intellectual Property Office, which is incorporated herein by reference in its entirety.

BACKGROUND

1. Technical Field

Various embodiments generally relate to a semiconductor apparatus, and more particularly, to a data storage device and an operating method thereof.

2. Related Art

In general, data newly stored in a memory may be regarded as hot data because it is expected that a read request for the data will be frequently provided by a host device.

In this regard, new data needs to be set as hot data and stored in a hot level memory for a relatively long time. Thus, when moving data from the hot level memory to a cold level memory, data other than the new data may be preferentially moved. However, if the new data is actually cold data, the hot level memory may unnecessarily store the new data, which is cold data, rather than data which is frequently requested to be read by a host device.

Meanwhile, data is randomly distributed in the cold level memory. Thus, when the data stored in the cold level memory needs to be restored into the hot level memory according to a read request, it is difficult to maintain a good hit rate in terms of performance in many cases.

SUMMARY

Embodiments of the present disclosure relate to a data storage device capable of improving a hit rate for data requested to be read by a host device and an operating method thereof.

In an embodiment, a data storage device may include: a first level memory including a first zone for storing new data provided by a host device and a second zone for storing restorage data, a size ratio of the first zone to the second zone being dynamically adjusted; a second level memory including a third zone for storing data transmitted from the first zone and a fourth zone for storing data transmitted from the third zone, a size ratio of the third zone to the fourth zone being dynamically adjusted according to the size ratio of the first zone to the second zone; and a controller configured to control data movement among the first zone, the second zone, the third zone, and the fourth zone, compare a counting value obtained based on the data movement with a reference value, and dynamically adjust the size ratio of the first zone to the second zone and the size ratio of the third zone to the fourth zone according to a result of comparing.

In an embodiment, an operating method of a data storage device may include the steps of: moving data among a first zone, a second zone, a third zone, and a fourth zone according to a data movement reference in a first level memory and a second level memory, the first level memory including the first zone and the second zone, the second level memory including the third zone and the fourth zone; acquiring a counting value by counting data movement among the first zone, the second zone, and the third zone; comparing the counting value with a reference value and dynamically adjusting a size ratio of the first zone to the second zone according to a result of comparing; and dynamically adjusting a size ratio of the third zone to the fourth zone according to the size ratio of the first zone to the second zone, wherein the first zone stores new data provided by a host device, the second zone stores restorage data, the third zone stores data transmitted from the first zone, and the fourth zone stores data transmitted from the third zone.

In accordance with the present embodiments, it is possible to improve a hit rate for restorage data stored in a hot level memory by quickly moving new data stored in the hot level memory into a cold level memory.

Furthermore, in accordance with the present embodiments, since data is stored in the cold level memory as being classified according to its possibility of being read, it is possible to systematically manage the data as well as prefetching data around target data requested to be read, resulting in the improvement of read performance.

DETAILED DESCRIPTION

Hereinafter, preferred embodiments of the present disclosure will be described with reference to the drawings.

Figure 1:
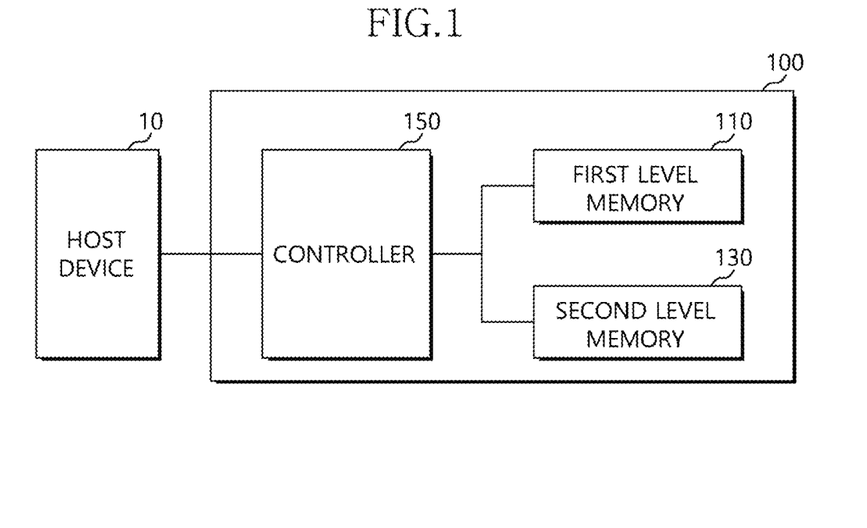
FIG. 1 is a diagram illustrating a data storage device in accordance with an embodiment of the present disclosure.
Figure 2:
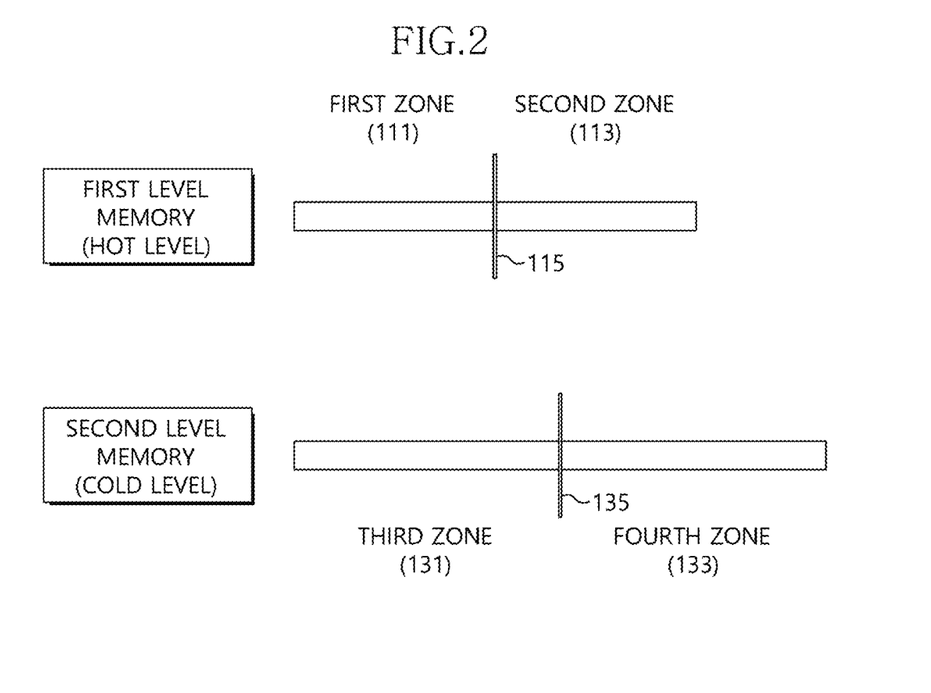
FIG. 2 is a diagram illustrating a multi-level memory in accordance with an embodiment of the present disclosure.

FIG. 1 is a diagram illustrating a data storage device 100 in accordance with an embodiment of the present disclosure, and FIG. 2 is a diagram illustrating a multi-level memory in accordance with an embodiment of the present disclosure.

Hereinafter, the following description will be given with reference to FIG. 3 explaining an example in which new data is stored in a first level memory in accordance with an embodiment of the present disclosure, FIG. 4 explaining an example in which new data stored in a first zone is moved into a second level memory in accordance with an embodiment of the present disclosure, FIG. 5 explaining an example in which data stored in a second zone is moved into the first zone in accordance with an embodiment of the present disclosure, and FIG. 6 explaining an example in which data is moved between a third zone and a fourth zone in accordance with an embodiment of the present disclosure.

Furthermore, the following description will be given with reference to FIG. 7 explaining an example in which data stored in the fourth zone is restored into the second zone in accordance with an embodiment of the present disclosure, and FIG. 8 explaining another example in which data stored in the fourth zone is restored into the second zone in accordance with an embodiment of the present disclosure.

Referring to FIG. 1 and FIG. 2, the data storage device 100 may include a first level memory 110, a second level memory 130, and a controller 150.

The first level memory 110 may include a first zone 111 for storing new data and a second zone 113 for storing restorage data. A size ratio of the first zone 111 to the second zone 113 may be dynamically adjusted. In the present embodiment, a case where new data is cold data will be described as an example. An initial size ratio of the first zone 111 to the second zone 113 may be 5:5.

The first level memory 110 is a hot level memory, and stores new data according to a write request from a host device 10 or reads and transmits the data according to a read request from the host device 10. Thus, the first level memory 110 may store data that is more frequently used than the data stored in the second level memory 130.

In the present embodiment, the first zone 111 is an area for storing new data provided by the host device 10, and may be a memory for quickly moving the new data to the second level memory 130 rather than retaining the new data therein for a long time. To this end, the size of the first zone 111 is changed by dynamically adjusting the size ratio of the first zone 111 to the second zone 113.

When the size of the first zone 111 is decreased, the first zone 111 is relatively quickly full of new data, and the first zone 111 evicts the new data into a third zone 131 in the second level memory 130 under the control of the controller 150. That is, when the size of the first zone 111 becomes smaller than a current size, the area of the first zone 111 for storing new data is reduced. Thus, the new data stored in the first zone 111 may be moved to the second level memory 130 more quickly.

The second zone 113 may store data requested to be read by a relatively large number of read requests from the host device 10, as compared with data stored in the first zone 111. That is, the second zone 113 stores data that is more frequently requested by the host device 10 than data stored in the first zone 111. Therefore, the second zone 113 is a hit zone and may be defined as an area capable of increasing a hit rate for the read requests from the host device 10 by retaining data as long as possible.

The aforementioned restorage data means data that has been read from the second level memory 130 and stored in the first level memory 110, except for the new data. In such a case, the restorage data still remains in the second level memory 130 even though it has been moved to the second zone 113.

The aforementioned first level memory 110 is a memory having a higher operating speed than the second level memory 130, and may be implemented with a DRAM, but the present disclosure is not limited thereto.

The second level memory 130 may include the third zone 131 for storing data transmitted from the first zone 111 and a fourth zone 133 for storing data transmitted from the third zone 131. A size ratio of the third zone 131 to the fourth zone 133 may be dynamically adjusted according to the size ratio of the first zone 111 to the second zone 113. An initial size ratio of the third zone 131 to the fourth zone 133 may be 5:5.

The fourth zone 133 may store data requested to be read by a relatively large number of requests for restorage to the second zone 113, as compared with data stored in the third zone 131. That is, the fourth zone 133 stores data that is more frequently moved to the second zone 113 than the data stored in the third zone 131.

The aforementioned second level memory 130 is a memory having a lower operating speed than the first level memory 110, and may be implemented with a NAND flash memory, but the present disclosure is not limited thereto.

Various types of memories may be used to implement the first level memory 110 and the second level memory 130 according to operator's requirements under the assumption that the first level memory 110 has a higher operating speed than the second level memory 130.

Referring to FIG. 2, the first level memory 110 may include a first fence 115 for distinguishing the first zone 111 from the second zone 113. An initial size ratio of the first zone 111 to the second zone 113 may be 5:5. A size ratio of the first zone 111 to the second zone 113 may be dynamically adjusted. The first fence 115 may be moved by adjusting the size ratio of the first zone 111 to the second zone 113.

Furthermore, the second level memory 130 may include a second fence 135 for distinguishing the third zone 131 from the fourth zone 133. An initial size ratio of the third zone 131 to the fourth zone 133 may be 5:5. A size ratio of the third zone 131 to the fourth zone 133 may be dynamically adjusted according to the size ratio of the first zone 111 to the second zone 113. The second fence 135 may be moved by adjusting the size ratio of the third zone 131 to the fourth zone 133.

The controller 150 may control data movement among the first zone 111, the second zone 113, the third zone 131, and the fourth zone 133, compare a counting value according to the data movement with a reference value, and adjust the size ratio of the first zone 111 to the second zone 113 and the size ratio of the third zone 131 to the fourth zone 133 according to a result of the comparison. The counting value may be determined based on how many times the data movement occurs among the first zone 111, the second zone 113, the third zone 131, and the fourth zone 133. This will be described later. In an embodiment, the reference value may be determined based on a predicted cache hit rate of a system including the data storage device 100.

Figure 3:
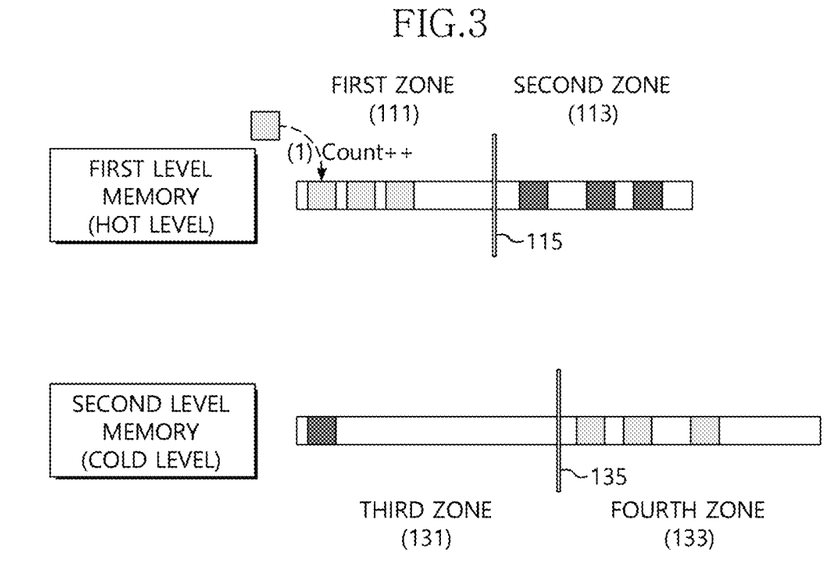
FIG. 3 is a diagram for explaining an example in which new data is stored in a first level memory in accordance with an embodiment of the present disclosure.

Referring to FIG. 3, when a write request for new data is transmitted from the host device 10, the controller 150 may store the new data in the first zone 111.

In such a case, the controller 150 may store the new data in the first zone 111 (1) and increase a value of a counter (count ++).

Figure 4:
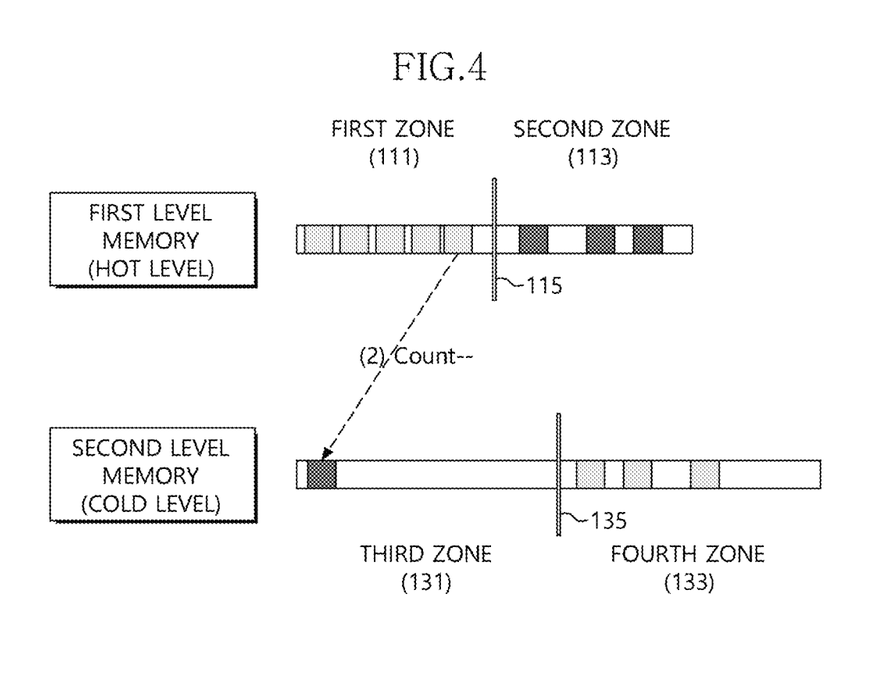
FIG. 4 is a diagram for explaining an example in which new data stored in a first zone is moved into a second level memory in accordance with an embodiment of the present disclosure.

Referring to FIG. 4, when a size of an available data storage space in the first zone 111 is equal to or less than a threshold value, the controller 150 may move and store data stored in the first zone 111 into the third zone 131. In such a case, the fact that the size of the available data storage space in the first zone 111 is equal to or less than the threshold value may indicate a state where the first zone 111 is full of data and thus new data cannot be stored in the first zone 111 anymore, or a state where a free space of the first zone 111 capable of storing new data is equal to or less than a preset free space reference value.

Here, the controller 150 may move the new data stored in the first zone 111 into the third zone 131 (2), and decrease the value of the counter (count −−).

In such a case, when moving the new data stored in the first zone 111 into the third zone 131, the controller 150 may move data, which is the least read requested data among the new data stored in the first zone 111, into the third zone 131. That is, the controller 150 may apply a least frequently used (LFU) rule to replace the least frequently used data among data stored in a corresponding zone.

Figure 5:
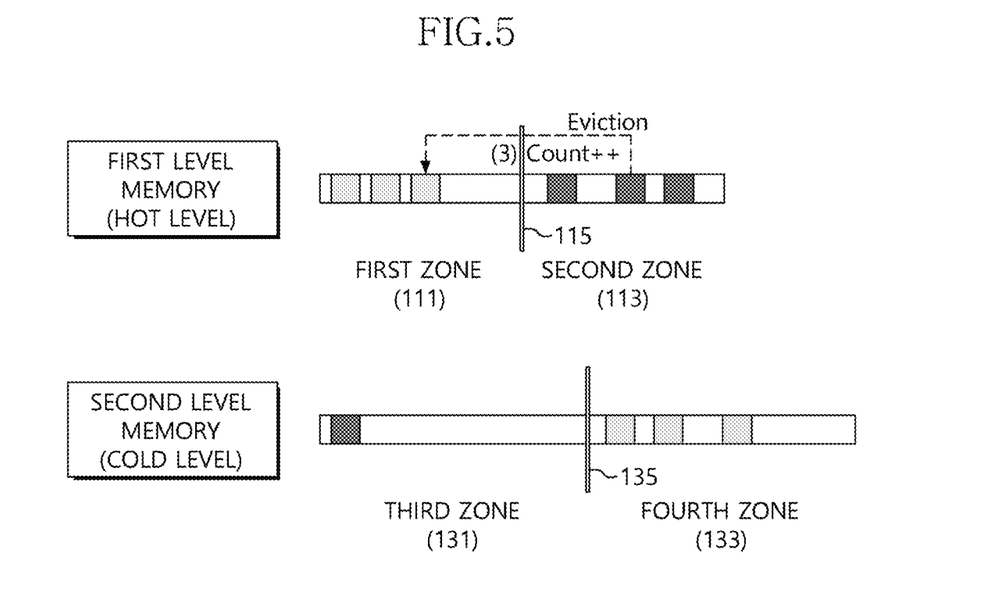
FIG. 5 is a diagram for explaining an example in which data stored in a second zone is moved into the first zone in accordance with an embodiment of the present disclosure.

Referring to FIG. 5, when a size of an available data storage space in the second zone 113 is equal to or less than the threshold value, the controller 150 may move data stored in the second zone 113 into the first zone 111. In such a case, the fact that the size of the available data storage space in the second zone 113 is equal to or less than the threshold value may indicate a state where the second zone 113 is full of data and thus restorage data cannot be stored in the second zone 113 anymore, or a state where a free space of the second zone 113 capable of storing restorage data is under the preset free space reference value.

Here, the controller 150 may move data from the second zone 113 into the first zone 111 (3), and increase the value of the counter (count ++).

Figure 6:
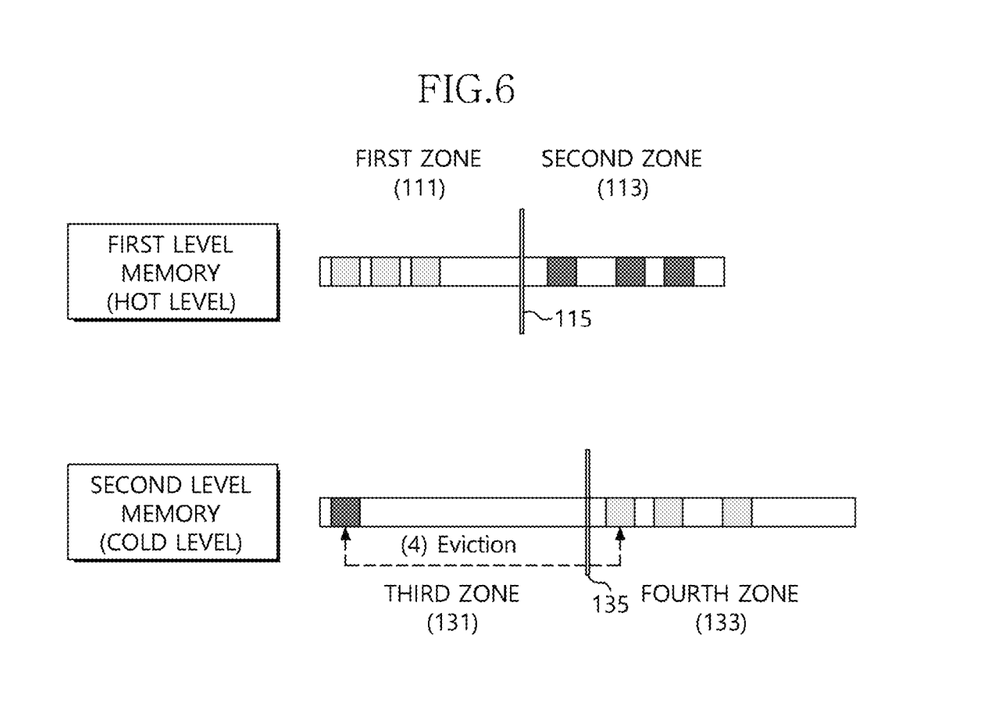
FIG. 6 is a diagram for explaining an example in which data is moved between a third zone and a fourth zone in accordance with an embodiment of the present disclosure.

Referring to FIG. 6, when a size of an available data storage space in the third zone 131 is equal to or less than the threshold value, the controller 150 may move data stored in the third zone 131 into the fourth zone 133 (4). In such a case, the fact that the size of the available data storage space in the third zone 131 is equal to or less than the threshold value may indicate a state where the third zone 131 is full of data and thus data cannot be stored in the third zone 131 anymore, or a state where a free space of the third zone 131 capable of storing data is equal to or less than the preset free space reference value.

Figure 7:
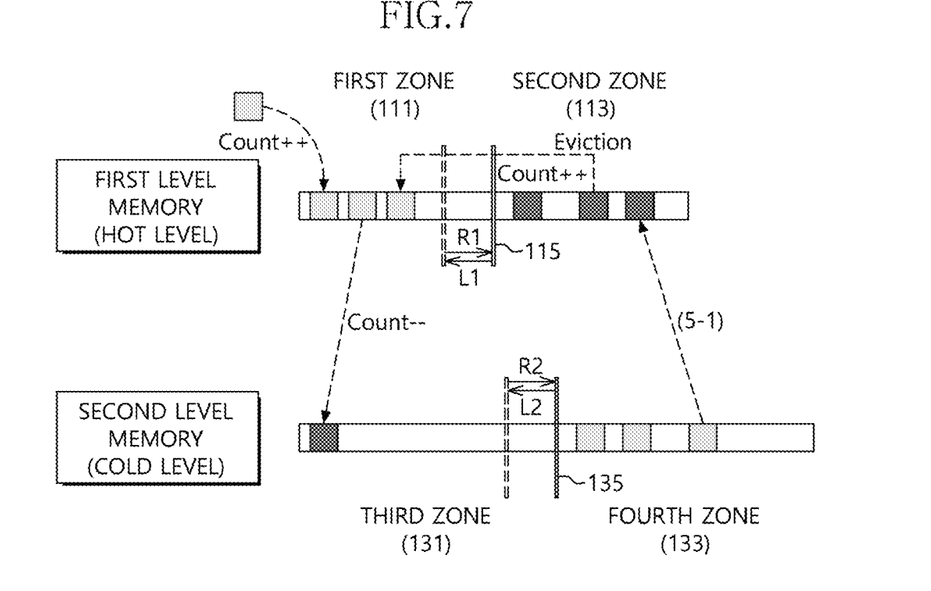
FIG. 7 is a diagram for explaining an example in which data stored in the fourth zone is restored into the second zone in accordance with an embodiment of the present disclosure.

Referring to FIG. 7, when data requested to be read does not exist in the second zone 113, the controller 150 may read the data from the fourth zone 133 and store the read data in the second zone 113 (5-1). In such a case, when the data requested to be read is not stored in the fourth zone 133, the controller 150 may read the data from the third zone 131 and store the read data in the second zone 113.

Figure 8:
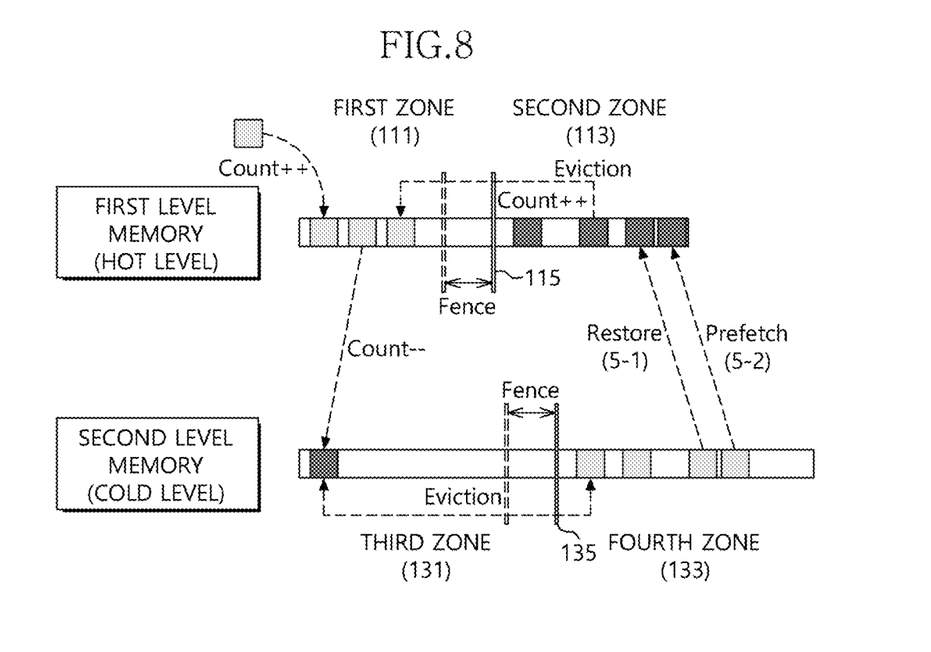
FIG. 8 is a diagram for explaining another example in which data stored in the fourth zone is restored into the second zone in accordance with an embodiment of the present disclosure.

Referring to FIG. 8, when the data read from the fourth zone 133 is stored in the second zone 113 (5-1), the controller 150 may prefetch data around the read data in the fourth zone 133 and store the prefetched data in the second zone 113 (5-2). The prefetched data may be data disposed within a predetermined range before and/or after the read data.

The controller 150 may compare the counting value, which is obtained by counting a first number of times that new data is stored in the first zone 111, a second number of times that data is moved from the first zone 111 into the third zone 131, and a third number of times that data is moved from the second zone 113 to the first zone 111, with the reference value, and adjust the size ratio of the first zone 111 to the second zone 113 by moving the first fence 115 based on a result of the comparison.

Specifically, the controller 150 may compare a fifth number of times, which is acquired by adding the third number of times to a fourth number of times acquired by subtracting the second number of times from the first number of times, with the reference value, and move the first fence 115 based on a result of the comparison. That is, in the present embodiment, the counting value corresponds to the fifth number of times.

When the fifth number of times, i.e., the counting value, is smaller than or equal to the reference value, the controller 150 may move the first fence 115 to increase the size of the first zone 111. That is, the first fence 115 is moved in a direction R1 shown in FIG. 7.

On the other hand, when the fifth number of times, i.e., the counting value, is larger than the reference value, the controller 150 may move the first fence 115 to increase the size of the second zone 113. That is, the first fence 115 is moved in a direction L1 shown in FIG. 7, the direction L1 being opposite to the direction R1.

Based on the movement information of the first fence 115, the controller 150 may move the second fence 135 in a direction R2 or a direction L2 shown in FIG. 7 in order to adjust the size ratio of the third zone 131 to the fourth zone 133 to correspond to the adjusted size ratio of the first zone 111 to the second zone 113. The movement information of the first fence 115 may include the direction in which the first fence 115 has moved and the adjusted size ratio. The direction R2 is opposite to the direction L2.

When adjusting the size ratio of the third zone 131 to the fourth zone 133, the controller 150 may not move data stored in each of the third zone 131 and the fourth zone 133 between the third zone 131 and the fourth zone 133. That is, when adjusting the size ratio of the third zone 131 to the fourth zone 133, the controller 150 moves only the second fence 135.

Figure 9:
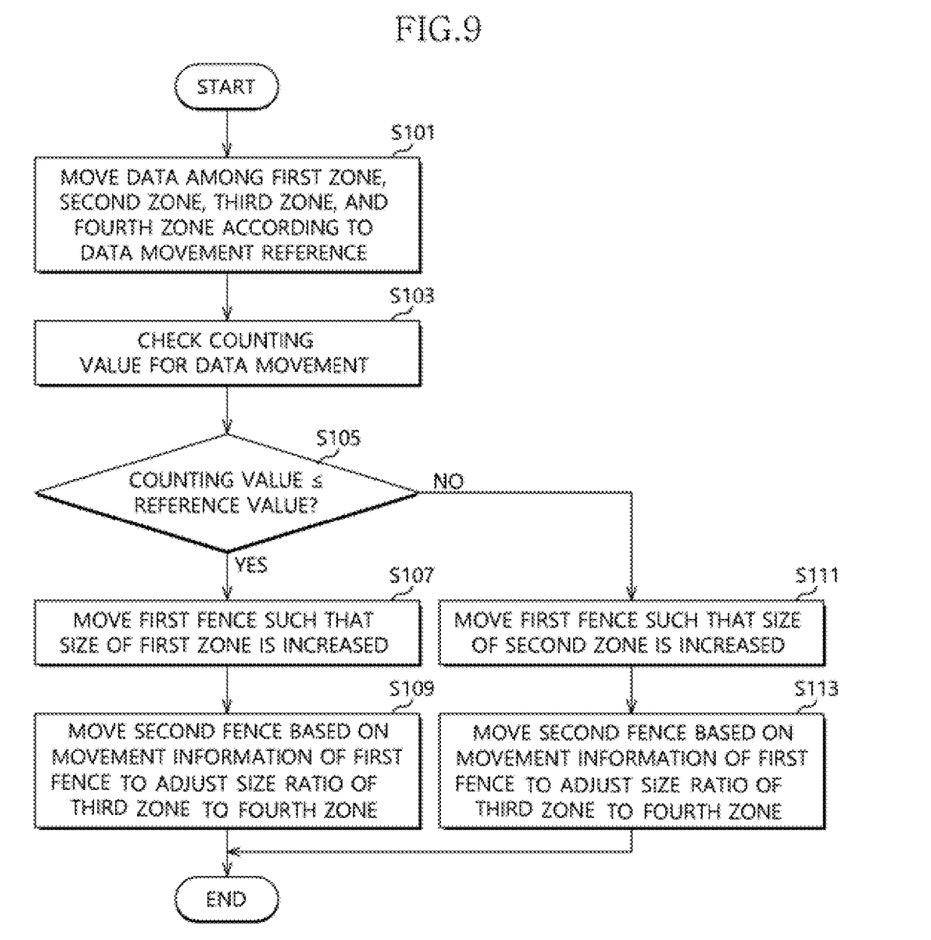
FIG. 9 is a flowchart for explaining an operating method of a data storage device in accordance with an embodiment of the present disclosure.

FIG. 9 is a flowchart for explaining an operating method of the data storage device 100 of FIG. 1 in accordance with an embodiment of the present disclosure. The operation method of FIG. 9 will be described with reference to FIGS. 1 to 8.

First, the data storage device 100 may move data among the first zone 111, the second zone 113, the third zone 131, and the fourth zone 133 according to a data movement reference in the first level memory 110 including the first zone 111 and the second zone 113 and the second level memory 130 including the third zone 131 and the fourth zone 133 (S101). The data movement reference indicates a rule for moving data stored in a current zone to another zone, and may indicate that a size of an available data storage space in the current zone is equal to or less than the threshold value in the present embodiment. In such a case, the fact that the size of the available data storage space in the current zone is equal to or less than the threshold value may indicate a state where the current zone is full of data and thus new data cannot be stored in the current zone anymore or a state where a free space of the current zone capable of storing data is equal to or less than the preset free space reference value.

In such a case, the first zone 111 may store new data, the second zone 113 may store restorage data from the fourth zone 133, the third zone 131 may store data transmitted from the first zone 111, and the fourth zone 133 may store data transmitted from the third zone 131.

When a size of an available data storage space in a data transmission side zone is equal to or less than the threshold value, the data storage device 100 may move data from the first zone 111 to the third zone 131, move data from the second zone 113 to the first zone 111, or move data from the third zone 131 to the fourth zone 133.

Meanwhile, in relation to a read request transmitted from the host device 10, when data requested to be read, which corresponds to the read request, does not exist in the second zone 113, the data storage device 100 may read the data from the fourth zone 133 and store the read data in the second zone 113.

If the data requested to be read is not stored in the fourth zone 133, the data storage device 100 may read the data from the third zone 131. In such a case, the data requested to be read that is stored in the third zone 131 may be moved into the fourth zone 133, and then may be moved from the fourth zone 133 into the second zone 113.

When storing the data requested to be read in the second zone 113, the data storage device 100 may prefetch data around the data requested to be read in the fourth zone 133 and stores the prefetched data in the second zone 113.

As described above, the first level memory 110 may include the first fence 115 for distinguishing the first zone 111 from the second zone 113. The second level memory 130 may include the second fence 135 for distinguishing the third zone 131 from the fourth zone 133.

Next, the data storage device 100 may acquire the counting value by counting the data movement times among the first zone 111, the second zone 113, and the third zone 131 (S103).

The data storage device 100 may acquire the counting value by counting the first number of times that new data is stored in the first zone 111, the second number of times that data is moved from the first zone 111 into the third zone 131, and the third number of times that data is moved from the second zone 113 to the first zone 111.

Specifically, the data storage device 100 may acquire, as the counting value, the fifth number of times acquired by adding the third number of times to the fourth number of times acquired by subtracting the second number of times from the first number of times.

Next, the data storage device 100 may compare the counting value with the reference value, and dynamically adjust the size ratio of the first zone 111 to the second zone 113 according to a result of the comparison (S105, S107, and S111).

The data storage device 100 may compare the counting value with the reference value, and adjust the size ratio of the first zone 111 to the second zone 113 by moving the first fence 115 based on the result of the comparison.

Specifically, when the fifth number of times, i.e., the counting value, is smaller than or equal to the reference value, the data storage device 100 may move the first fence 115 to increase the size of the first zone 111 (S107).

On the other hand, when the fifth number of times, i.e., the counting value, is larger than the reference value, the data storage device 100 may move the first fence 115 to increase the size of the second zone 113 (S111).

Next, the data storage device 100 may dynamically adjust the size ratio of the third zone 131 to the fourth zone 133 according to the size ratio of the first zone 111 to the second zone 113 (S109 and S113).

Specifically, based on the movement information of the first fence 115, the data storage device 100 may move the second fence 135 to adjust the size ratio of the third zone 131 to the fourth zone 133 to correspond to the adjusted size ratio of the first zone 111 to the second zone 113. That is, when the size of the first zone 111 is increased by moving the first fence 115, the second fence 135 is moved to increase the size of the third zone 131. On the other hand, when the size of the second zone 113 is increased by moving the first fence 115, the second fence 135 is moved to increase the size of the fourth zone 133.

Since the present disclosure may be carried out in other specific forms without its technical scope or essential features not changed, a person skilled in the art to which the present disclosure pertains should understand that the embodiments described above are illustrative in all aspects are not limitative. The scope of the present disclosure is defined by the claims to be described below rather than the detailed description, and all modifications or modified forms derived from the meaning and scope of the claims and the equivalent concept thereto should be interpreted as being included in the scope of the present disclosure.

What is claimed is:

1. A data storage device, comprising:
a first level memory including i) a first zone storing new data provided by a host device and ii) a second zone storing restorage data, wherein a size ratio of the first zone to the second zone is dynamically adjusted;
a second level memory including i) a third zone storing data transmitted from the first zone and ii) a fourth zone storing data transmitted from the third zone, wherein a size ratio of the third zone to the fourth zone is dynamically adjusted according to the size ratio of the first zone to the second zone;
and a controller configured to i) control data movement among the first zone, the second zone, the third zone, and the fourth zone, ii) compare a counting value, obtained based on the data movement, with a reference value, and iii) dynamically adjust the size ratio of the first zone to the second zone and the size ratio of the third zone to the fourth zone according to a result of comparing the counting value with the reference value.

2. The data storage device according to claim 1, wherein, when a size of an available data storage space in the first zone is equal to or less than a threshold value, the controller moves data stored in the first zone into the third zone.

3. The data storage device according to claim 2, wherein, when moving the data stored in the first zone into the third zone, the controller moves least read requested data in the first zone into the third zone.

4. The data storage device according to claim 1, wherein, when a size of an available data storage space in the second zone is equal to or less than a threshold value, the controller moves data stored in the second zone into the first zone.

5. The data storage device according to claim 1, wherein, when a size of an available data storage space in the third zone is equal to or less than a threshold value, the controller moves data stored in the third zone into the fourth zone.

6. The data storage device according to claim 1, wherein, when data requested to be read is absent in the second zone, the controller reads the read-requested data from the fourth zone and stores, as the restorage data, the read-requested data in the second zone.

7. The data storage device according to claim 6, wherein, when storing the read-requested data in the second zone, the controller prefetches data around the read-requested data in the fourth zone and stores the prefetched data in the second zone.

8. The data storage device according to claim 1, wherein the first level memory includes a first fence that distinguishes the first zone from the second zone, and the second level memory includes a second fence that distinguishes the third zone from the fourth zone.

9. The data storage device according to claim 8, wherein the controller obtains the counting value by counting a first number of times that the new data is stored in the first zone, a second number of times that data is moved from the first zone into the third zone, and a third number of times that data is moved from the second zone into the first zone, and the controller adjusts the size ratio of the first zone to the second zone by moving the first fence based on the result of comparing the counting value with the reference value.

10. The data storage device according to claim 9, wherein the counting value is a fifth number of times that the controller obtains by adding the third number of times to a fourth number of times, the fourth number of times being acquired by subtracting the second number of times from the first number of times.

11. The data storage device according to claim 10, wherein, when the counting value is smaller than or equal to the reference value, the controller moves the first fence to increase a size of the first zone, and
when the counting value is larger than the reference value, the controller moves the first fence to increase a size of the second zone.

12. The data storage device according to claim 11, wherein the controller moves the second fence based on movement information of the first fence and adjusts the size ratio of the third zone to the fourth zone to correspond to the adjusted size ratio of the first zone to the second zone.

13. The data storage device according to claim 12, wherein, when adjusting the size ratio of the third zone to the fourth zone, the controller does not move data, stored in each of the third zone and the fourth zone, between the third zone and the fourth zone.

14. The data storage device according to claim 1, wherein the second zone stores data that is frequently requested, by the host device, compared to data stored in the first zone, and the fourth zone stores data that is frequently moved, to the second zone, compared to data stored in the third zone.

15. An operating method of a data storage device, the operating method comprising:
moving data among a first zone, a second zone, a third zone, and a fourth zone according to a data movement reference of a first level memory and a second level memory, wherein the first level memory includes the first zone and the second zone, and the second level memory includes the third zone and the fourth zone;
acquiring a counting value by counting data movement among the first zone, the second zone, and the third zone;
comparing the counting value with a reference value and dynamically adjusting a size ratio of the first zone to the second zone according to a result of comparing the counting value with the reference value;
and dynamically adjusting a size ratio of the third zone to the fourth zone according to the size ratio of the first zone to the second zone,
wherein the first zone stores new data provided by a host device, the second zone stores restorage data, the third zone stores data transmitted from the first zone, and the fourth zone stores data transmitted from the third zone.

16. The operating method according to claim 15, wherein the first level memory includes a first fence that distinguishes the first zone from the second zone, and the second level memory includes a second fence that distinguishes the third zone from the fourth zone.

17. The operating method according to claim 16, wherein acquiring the counting value comprises counting a first number of times that the new data is stored in the first zone, a second number of times that data is moved from the first zone into the third zone, and a third number of times that data is moved from the second zone into the first zone, and dynamically adjusting the size ratio of the first zone to the second zone comprises moving the first fence to adjust the size ratio of the first zone to the second zone.

18. The operating method according to claim 17, wherein the counting value is a fifth number of times that is acquired by adding the third number of times to a fourth number of times, the fourth number of times being acquired by subtracting the second number of times from the first number of times,
and wherein dynamically adjusting the size ratio of the first zone to the second zone comprises:
when the fifth number of times is smaller than or equal to the reference value, moving the first fence to increase a size of the first zone;
and when the fifth number of times is larger than the reference value, moving the first fence to increase a size of the second zone.

19. The operating method according to claim 18, wherein dynamically adjusting the size ratio of the third zone to the fourth zone comprises moving the second fence based on movement information of the first fence, and adjusting the size ratio of the third zone to the fourth zone to correspond to the adjusted size ratio of the first zone to the second zone.

20. The operating method according to claim 15, wherein moving the data among the first zone, the second zone, the third zone, and the fourth zone according to the data movement reference of the first level memory and the second level memory comprises:
moving data from the first zone to the third zone when a size of an available data storage space in the first zone is equal to or less than a threshold value;
moving data from the second zone to the first zone when a size of an available data storage space in the second zone is equal to or less than the threshold value;
and moving data from the third zone to the fourth zone when a size of an available data storage space in the third zone is equal to or less than the threshold value.

21. The operating method according to claim 15, wherein moving the data among the first zone, the second zone, the third zone, and the fourth zone according to the data movement reference of the first level memory and the second level memory comprises:
when data requested to be read is absent in the second zone, reading the read-requested data from the fourth zone and storing the read-requested data in the second zone;
and when storing the read-requested data from the fourth zone in the second zone, prefetching data around the read-requested data and storing the prefetched data in the second zone.

* * * * *